(12) United States Patent
Paullin et al.

(10) Patent No.: US 11,225,530 B2
(45) Date of Patent: Jan. 18, 2022

(54) PREPARATION OF POLY ALPHA-1,3-GLUCAN ESTERS USING CYCLIC ORGANIC ANHYDRIDES

(71) Applicant: NUTRITION & BIOSCIENCES USA 4, INC., Rochester, NY (US)

(72) Inventors: Jayme L. Paullin, Claymont, DE (US); Rakesh Nambiar, West Chester, PA (US); Christian Peter Lenges, Wilmington, DE (US)

(73) Assignee: NUTRITION & BIOSCIENCES USA 4, INC., Rochester, NY (US)

( * ) Notice: Subject to any disclaimer, the term of this patent is extended or adjusted under 35 U.S.C. 154(b) by 0 days.

(21) Appl. No.: 16/838,230

(22) Filed: Apr. 2, 2020

(65) Prior Publication Data
US 2020/0347152 A1  Nov. 5, 2020

Related U.S. Application Data

(63) Continuation of application No. 15/578,434, filed as application No. PCT/US2016/038909 on Jun. 23, 2016, now abandoned.

(60) Provisional application No. 62/186,570, filed on Jun. 30, 2015.

(51) Int. Cl.
*C08B 37/00* (2006.01)

(52) U.S. Cl.
CPC .................. *C08B 37/0009* (2013.01)

(58) Field of Classification Search
CPC .................................. C08B 37/0009
See application file for complete search history.

(56) References Cited

U.S. PATENT DOCUMENTS

| | | | |
|---|---|---|---|
| 2014/0187766 A1* | 7/2014 | Kasat | C08L 5/00 |
| | | | 536/119 |
| 2014/0187767 A1* | 7/2014 | Kasat | C08J 5/18 |
| | | | 536/119 |

FOREIGN PATENT DOCUMENTS

WO    WO 2014105698    *  7/2014

* cited by examiner

*Primary Examiner* — Bahar Craigo

(57) ABSTRACT

Poly alpha-1,3-glucan ester compounds are disclosed herein with a degree of substitution of about 0.001 to about 3.0. Also disclosed are methods of producing poly alpha-1,3-glucan ester compounds using cyclic organic anhydrides.

11 Claims, No Drawings

PREPARATION OF POLY ALPHA-1,3-GLUCAN ESTERS USING CYCLIC ORGANIC ANHYDRIDES

This application is a continuation of U.S. application Ser. No. 15/578,434 (filed Nov. 30, 2017), which is the National Stage application of International Application No. PCT/US2016/038909 (filed Jun. 23, 2016), which claims the benefit of U.S. Provisional Application No. 62/186,570 (filed Jun. 30, 2015). All of these prior applications are incorporated herein by reference in their entirety.

FIELD OF INVENTION

The present disclosure is in the field of poly alpha-1,3-glucan derivatives. For example, the disclosure pertains to poly alpha-1,3-glucan esters and methods of their preparation using cyclic organic acid anhydrides.

BACKGROUND

Driven by a desire to find new structural polysaccharides using enzymatic syntheses or genetic engineering of microorganisms or plant hosts, researchers have discovered polysaccharides that are biodegradable, and that can be made economically from renewable resource-based feedstocks. One such polysaccharide is poly alpha-1,3-glucan, a glucan polymer characterized by having alpha-1,3-glycosidic linkages. This polymer has been isolated by contacting an aqueous solution of sucrose with a glucosyltransferase enzyme isolated from *Streptococcus salivarius* (Simpson et al., *Microbiology* 141:1451-1460, 1995). Films prepared from poly alpha-1,3-glucan tolerate temperatures up to 150° C. and provide an advantage over polymers obtained from beta-1,4-linked polysaccharides (Ogawa et al., *Fiber Differentiation Methods* 47:353-362, 1980).

U.S. Pat. No. 7,000,000 disclosed the preparation of a polysaccharide fiber comprising hexose units, wherein at least 50% of the hexose units within the polymer were linked via alpha-1,3-glycosidic linkages using an *S. salivarius* gtfJ enzyme. This enzyme utilizes sucrose as a substrate in a polymerization reaction producing poly alpha-1,3-glucan and fructose as end-products (Simpson et al., 1995). The disclosed polymer formed a liquid crystalline solution when it was dissolved above a critical concentration in a solvent or in a mixture comprising a solvent. From this solution, continuous, strong, cotton-like fibers, highly suitable for use in textiles, were spun and used.

Yui et al. (*Int. J. Biol. Macromol.* 14:87-96, 1992) disclose using poly alpha-1,3-glucan extracted from the fruiting body of the fungus, *Laetiporus silphureus*, to synthesize poly alpha-1,3-glucan triacetate. The structure of this polymer was analyzed by X-ray crystallography.

Ogawa et al. (*Carb. Poly.* 3:287-297, 1983) used three different samples of poly alpha-1,3-glucan to prepare poly alpha-1,3-glucan triacetate. One sample was isolated from a bacterial extracellular polysaccharide, and the other two samples were extracted from fruiting bodies of fungi. The structures of these polymers were analyzed by X-ray crystallography.

U.S. Patent Appl. Publ. Nos. 2014/0187767 and 2014/0187766 disclose poly alpha-1,3-glucan esters and methods of their production, as well as films comprising such poly alpha-1,3-glucan esters.

Development of new poly alpha-1,3-glucan ester derivatives and methods of preparing such derivatives is desirable given their potential utility in various applications.

SUMMARY OF INVENTION

One embodiment of the present disclosure concerns a composition comprising a poly alpha-1,3-glucan ester compound represented by the structure:

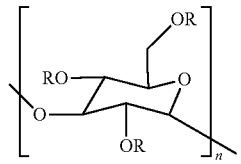

wherein
(i) n is at least 6;
(ii) each R is independently an —H or a first group comprising —CO—$C_x$—COOH, wherein the —$C_x$— portion of the first group comprises a chain of 2 to 6 carbon atoms; and
(iii) the compound has a degree of substitution with the first group of about 0.001 to about 3.0.

In another embodiment, the —$C_x$— portion of the first group comprises only $CH_2$ groups. The first group in this embodiment can comprise —CO—$CH_2$—$CH_2$—COOH, —CO—$CH_2$—$CH_2$—$CH_2$—COOH, —CO—$CH_2$—$CH_2$—$CH_2$—$CH_2$—COOH, —CO—$CH_2$—$CH_2$—$CH_2$—$CH_2$—$CH_2$—COOH, or —CO—$CH_2$—$CH_2$—$CH_2$—$CH_2$—$CH_2$—$CH_2$—COOH, for example.

In another embodiment, the —$C_x$— portion of the first group comprises: (i) at least one double-bond in the carbon atom chain, and/or (ii) at least one branch comprising an organic group.

In another embodiment, the —$C_x$— portion of the first group comprises at least one double-bond in the carbon atom chain. The first group comprises —CO—CH=CH—COOH in another embodiment.

In another embodiment, the —$C_x$— portion of the first group comprises at least one branch comprising an organic group. The first group comprises:

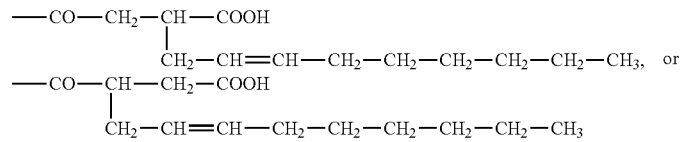

in another embodiment.

In another embodiment, the present disclosure concerns a method of producing a poly alpha-1,3-glucan ester compound. This method comprises:

(a) contacting poly alpha-1,3-glucan in a reaction with a cyclic organic anhydride, thereby producing a poly alpha-1,3-glucan ester compound represented by the structure:

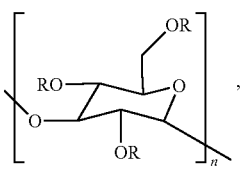

wherein
(i) n is at least 6;
(ii) each R is independently an —H or a first group comprising —CO—C$_x$—COOH, wherein the —C$_x$— portion of said first group comprises a chain of 2 to 6 carbon atoms; and
(iii) the compound has a degree of substitution with the first group of about 0.001 to about 3.0; and (b) optionally, isolating the poly alpha-1,3-glucan ester compound produced in step (a).

In another embodiment, the reaction initially consists of the poly alpha-1,3-glucan and cyclic organic anhydride, wherein the cyclic organic anhydride is melted.

In another embodiment, the reaction does not comprise an organic solvent.

In another embodiment, the reaction comprises aqueous conditions. A basic pH is maintained during the reaction in another embodiment.

In another embodiment, the poly alpha-1,3-glucan and poly alpha-1,3-glucan ester are each in a solid form during the reaction.

In another embodiment, the reaction does not comprise a catalyst.

DETAILED DESCRIPTION

The disclosures of all patent and non-patent literature cited herein are incorporated herein by reference in their entirety.

Unless otherwise disclosed, the terms "a" and "an" as used herein are intended to encompass one or more (i.e., at least one) of a referenced feature.

Where present, all ranges are inclusive and combinable, except as otherwise noted. For example, when a range of "1 to 5" is recited, the recited range should be construed as including ranges "1 to 4", "1 to 3", "1-2", "1-2 & 4-5", "1-3 & 5", and the like.

The terms "poly alpha-1,3-glucan", "alpha-1,3-glucan polymer", "alpha-1,3-glucan", "glucan polymer" and the like are used interchangeably herein. Poly alpha-1,3-glucan is a polymer comprising glucose monomeric units linked together by glycosidic linkages, wherein at least about 50% of the glycosidic linkages are alpha-1,3-glycosidic linkages. Poly alpha-1,3-glucan is a type of polysaccharide.

Poly alpha-1,3-glucan that can be used for preparing poly alpha-1,3-glucan ester compounds herein can be prepared using chemical methods. Alternatively, it can be prepared by extracting it from various organisms, such as fungi, that produce poly alpha-1,3-glucan. Alternatively still, poly alpha-1,3-glucan can be enzymatically produced from sucrose using one or more glucosyltransferase (gtf) enzymes, such as described in U.S. Patent Appl. Publ. No. 2014/0087431, which is incorporated herein by reference.

The terms "glucosyltransferase enzyme", "gtf enzyme", "gtf enzyme catalyst", "gtf", "glucansucrase" and the like are used interchangeably herein. The activity of a gtf enzyme herein catalyzes the reaction of the substrate sucrose to make the products poly alpha-1,3-glucan and fructose. Other products (byproducts) of a gtf reaction can include glucose, various soluble gluco-oligosaccharides (DP2-DP7), and leucrose. Wild type forms of glucosyltransferase enzymes generally contain (in the N-terminal to C-terminal direction) a signal peptide, a variable domain, a catalytic domain, and a glucan-binding domain. A gtf herein is classified under the glycoside hydrolase family 70 (GH70) according to the CAZy (Carbohydrate-Active EnZymes) database (Cantarel et al., *Nucleic Acids Res.* 37:D233-238, 2009).

The terms "glycosidic linkage" and "glycosidic bond" are used interchangeably herein and refer to the covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. The glycosidic linkages of an alpha-1,3-glucan herein can also be referred to as "glucosidic linkages". Herein, "alpha-D-glucose" is referred to as "glucose".

The terms "poly alpha-1,3-glucan ester compound", "poly alpha-1,3-glucan ester", "poly alpha-1,3-glucan ester derivative", "glucan ester" and the like are used interchangeably herein. A poly alpha-1,3-glucan ester compound herein can be represented by the structure:

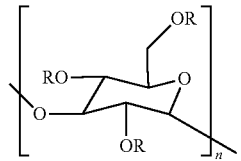

Regarding the formula of this structure, n can be at least 6, and each R can independently be a hydrogen atom (H) or a first group comprising —CO—C$_x$—COOH, wherein the —C$_x$— portion of the first group can comprise a chain of 2 to 6 carbon atoms, preferably wherein each carbon atom has four covalent bonds. A poly alpha-1,3-glucan ester compound herein has a degree of substitution of about 0.001 to about 3.0.

A poly alpha-1,3-glucan ester compound is termed an "ester" herein by virtue of comprising the substructure —C$_G$—O—CO—C$_x$—, where "—C$_G$—" represents carbon 2, 4, or 6 of a glucose monomeric unit of a poly alpha-1,3-glucan ester compound, and where "—CO—C$_x$—" is comprised in the first group.

A "first group" herein comprises —CO—C$_x$—COOH. The term "—C$_x$—" refers to a portion of the first group that typically comprises a chain of 2 to 6 carbon atoms, each carbon atom preferably having four covalent bonds.

The terms "poly alpha-1,3-glucan monoester" and "monoester" are used interchangeably herein. A poly alpha-1,3-glucan monoester contains one type of first group.

The terms "poly alpha-1,3-glucan mixed ester" and "mixed ester" are used interchangeably herein. A poly alpha-1,3-glucan mixed ester contains two or more types of a first group.

The terms "reaction", "esterification reaction", "reaction composition", "reaction preparation" and the like are used interchangeably herein and refer to a reaction comprising, or consisting of, poly alpha-1,3-glucan and at least one cyclic organic anhydride. A reaction is placed under suitable conditions (e.g., time, temperature, pH) for esterification of one or more hydroxyl groups of the glucose units of poly alpha-1,3-glucan with a first group provided by the cyclic organic anhydride, thereby yielding a poly alpha-1,3-glucan ester compound.

The terms "cyclic organic anhydride", "cyclic organic acid anhydride", "cyclic acid anhydride" and the like are used interchangeably herein. A cyclic organic anhydride herein can have the formula:

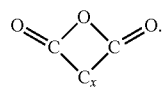
(I)

The —$C_x$— portion of formula I typically comprises a chain of 2 to 6 carbon atoms; each carbon atom in this chain preferably has four covalent bonds. During an esterification reaction herein, the anhydride group (—CO—O—CO—) of a cyclic organic anhydride breaks such that one end of the broken anhydride becomes a —COOH group and the other end is esterified to a hydroxyl group of poly alpha-1,3-glucan, thereby rendering an esterified first group (—CO—$C_x$—COOH).

The term "degree of substitution" (DoS) as used herein refers to the average number of hydroxyl groups substituted in each monomeric unit (glucose) of a poly alpha-1,3-glucan ester compound. Since there are three hydroxyl groups in each monomeric unit in poly alpha-1,3-glucan, the DoS in a poly alpha-1,3-glucan ester compound herein can be no higher than 3.

"Contacting" herein can be performed by any means known in the art, such as dissolving, mixing, shaking, or homogenization, for example. Where three or more reaction components are contacted with each other, such contacting can be done all at once or in stages (e.g., two components mixed before mixing in a third component).

The term "melted cyclic organic anhydride" and related terms as used herein refer to cyclic organic anhydride that is at a temperature at which the compound melts (i.e., goes into a liquid state) (the temperature is over the melting point of the anhydride).

An esterification reaction comprising "aqueous conditions" in certain embodiments refers to a reaction that, as initially set up, comprises at least 1 wt % water.

A "basic pH" in certain embodiments refers to a pH that is at least about 7.5.

A "catalyst" as used herein refers to a substance that increases the rate of an esterification reaction herein without itself undergoing any permanent chemical change. Acid catalysts are examples of such catalysts.

The term "poly alpha-1,3-glucan slurry" herein refers to an aqueous mixture comprising the components of a glucosyltransferase enzymatic reaction such as poly alpha-1,3-glucan, sucrose, one or more glucosyltransferase enzymes, glucose and fructose.

The term "poly alpha-1,3-glucan wet cake" herein refers to poly alpha-1,3-glucan that has been separated from a slurry and washed with water or an aqueous solution. Poly alpha-1,3-glucan is not dried when preparing a wet cake.

The term "film" as used herein refers to a thin, visually continuous material. A film can be comprised as a thin layer or coating on a material, or can be alone (e.g., not attached to a material surface). A "coating" as used herein refers to a thin layer covering a surface of a material.

The terms "percent by volume", "volume percent", "vol %", "v/v %" and the like are used interchangeably herein.

The percent by volume of a solute in a solution can be determined using the formula: [(volume of solute)/(volume of solution)]×100%.

The terms "percent by weight", "weight percentage (wt %)", "weight-weight percentage (% w/w)" and the like are used interchangeably herein. Percent by weight refers to the percentage of a material on a mass basis as it is comprised in a composition, mixture or solution.

The term "increased" as used herein can refer to a quantity or activity that is at least about 1%, 2%, 3%, 4%, 5%, 6%, 7%, 8%, 9%, 10%, 11%, 12%, 13%, 14%, 15%, 16%, 17%, 18%, 19%, 20%, 50%, 100%, or 200% more than the quantity or activity for which the increased quantity or activity is being compared. The terms "increased", "elevated", "enhanced", "greater than", "improved" and the like are used interchangeably herein.

The term "isolated" as used herein refers to material (e.g., poly alpha-1,3-glucan ester) that has been completely or partially purified. Poly alpha-1,3-glucan ester compounds of the present disclosure are synthetic, man-made compounds. Such compounds are believed to not occur in nature.

Embodiments of the present disclosure concern a composition comprising a poly alpha-1,3-glucan ester compound represented by the structure:

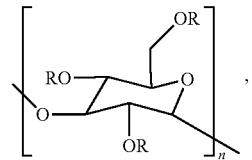

wherein
(i) n is at least 6;
(ii) each R is independently an —H or a first group comprising —CO—$C_x$—COOH, wherein the —$C_x$— portion of the first group typically comprises a chain of 2 to 6 carbon atoms; and
(iii) the compound has a degree of substitution with the first group of about 0.001 to about 3.0.

Significantly, such ester compounds can be produced in reactions comprising a limited number of reagents, and isolated in a facile manner.

Each R group in the formula of a poly alpha-1,3-glucan ester compound herein can independently be an —H or a first group comprising —CO—$C_x$—COOH. The —$C_x$— portion of the first group typically comprise a chain of 2 to 6 carbon atoms; each of these carbon atoms is preferably involved in four covalent bonds. In general, each carbon in the chain, aside from being covalently bonded with an adjacent carbon atom(s) in the chain or a carbon atom of the flanking C═O and COOH groups, can also be bonded to hydrogen(s), a substituent group(s) such as an organic group, and/or be involved in a carbon-carbon double-bond. For example, a carbon atom in the —$C_x$— chain can be saturated (i.e., —$CH_2$—), double-bonded with an adjacent carbon atom in the —$C_x$— chain (e.g., —CH═CH—), and/or be bonded to a hydrogen and an organic group (i.e., one hydrogen is substituted with an organic group). Skilled artisans would understand how the carbon atoms of the —$C_x$— portion of a first group comprising —CO—$C_x$—COOH can typically be bonded, given that carbon has a valency of four. It is contemplated that, in some embodiments, the —$C_x$— portion of the first group can comprise a chain of 2 to 16, 2 to 17, or 2 to 18 carbon atoms.

In certain embodiments of the present disclosure, the —$C_x$— portion of the first group (—CO—$C_x$—COOH) comprises only $CH_2$ groups. Examples of a first group in which the —$C_x$— portion comprises only $CH_2$ groups are —CO—$CH_2$—$CH_2$—COOH, —CO—$CH_2$—$CH_2$—$CH_2$—COOH, —CO—$CH_2$—$CH_2$—$CH_2$—$CH_2$—COOH, —CO—$CH_2$—$CH_2$—$CH_2$—$CH_2$—$CH_2$—COOH, and —CO—$CH_2$—$CH_2$—$CH_2$—$CH_2$—$CH_2$—$CH_2$—COOH. As further disclosed below regarding processes for synthesizing a poly alpha-1,3-glucan ester compound, these first groups can be derived, respectively, by reacting succinic anhydride, glutaric anhydride, adipic anhydride, pimelic anhydride, or suberic anhydride with poly alpha-1,3-glucan.

The —$C_x$— portion of the first group (—CO—$C_x$—COOH) in some aspects herein can comprise (i) at least one double-bond in the carbon atom chain, and/or (ii) at least one branch comprising an organic group. For instance, the —$C_x$— portion of the first group can have at least one double-bond in the carbon atom chain. Examples of a first group in which the —$C_x$— portion comprises a carbon-carbon double-bond include —CO—CH═CH—COOH, —CO—CH═CH—$CH_2$—COOH, —CO—CH═CH—$CH_2$—$CH_2$—COOH, —CO—CH═CH—$CH_2$—$CH_2$—$CH_2$—COOH, —CO—CH═CH—$CH_2$—$CH_2$—$CH_2$—$CH_2$—COOH, —CO—$CH_2$—CH═CH—COOH, —CO—$CH_2$—CH═CH—$CH_2$—COOH, —CO—$CH_2$—CH═CH—$CH_2$—$CH_2$—COOH, —CO—$CH_2$—CH═CH—$CH_2$—$CH_2$—$CH_2$—COOH, —CO—$CH_2$—CH═CH—$CH_2$—COOH, —CO—$CH_2$—$CH_2$—CH═CH—COOH, —CO—$CH_2$—$CH_2$—CH═CH—$CH_2$—COOH, —CO—$CH_2$—$CH_2$—CH═CH—$CH_2$—$CH_2$—COOH, —CO—$CH_2$—$CH_2$—$CH_2$—CH═CH—COOH, —CO—$CH_2$—$CH_2$—$CH_2$—CH═CH—$CH_2$—COOH, —CO—$CH_2$—$CH_2$—$CH_2$—$CH_2$—CH═CH—COOH, and —CO—$CH_2$—$CH_2$—$CH_2$—$CH_2$—$CH_2$—CH═CH—COOH. As further disclosed below regarding processes for synthesizing a poly alpha-1,3-glucan ester compound, each of these first groups can be derived by reacting the appropriate cyclic organic anhydride with poly alpha-1,3-glucan. For example, to produce a first group comprising —CO—CH═CH—COOH, maleic anhydride can be reacted with poly alpha-1,3-glucan. Thus, a cyclic organic anhydride comprising a —$C_x$— portion represented in any of the above-listed first groups (where the corresponding —$C_x$— portion of a cyclic organic anhydride is that portion linking each side of the anhydride group [—CO—O—CO—] together to form a cycle) can be reacted with poly alpha-1,3-glucan to produce an ester thereof having the corresponding first group (—CO—$C_x$—COOH).

The —$C_x$— portion of the first group (—CO—$C_x$—COOH) in some aspects herein can comprise at least one branch comprising an organic group. Examples of a first group in which the —$C_x$— portion comprises at least one organic group branch include:

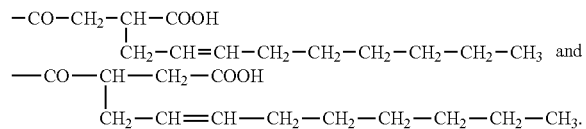

As further disclosed below regarding processes for synthesizing a poly alpha-1,3-glucan ester compound, each of these two first groups can be derived by reacting 2-nonen-1-yl succinic anhydride with poly alpha-1,3-glucan. It can be seen that the organic group branch (generically termed "$R^b$" herein) in both these examples is —$CH_2$—CH═CH—$CH_2$—$CH_2$—$CH_2$—$CH_2$—$CH_2$—$CH_3$. It can also be seen that the $R^b$ group substitutes for a hydrogen in the —$C_x$— carbon chain.

Thus, for example, a first group (—CO—$C_x$—COOH) herein can be any of —CO—$CH_2$—$CH_2$—COOH, —CO—$CH_2$—$CH_2$—$CH_2$—COOH, —CO—$CH_2$—$CH_2$—$CH_2$—$CH_2$—COOH, —CO—$CH_2$—$CH_2$—$CH_2$—$CH_2$—$CH_2$—COOH, or —CO—$CH_2$—$CH_2$—$CH_2$—$CH_2$—$CH_2$—$CH_2$—COOH, but in which at least one, two, three, or more hydrogens thereof is/are substituted with an $R^b$ group. Also for example, a first group (—CO—$C_x$—COOH) herein can be any of —CO—CH═CH—$CH_2$—COOH, —CO—CH═CH—$CH_2$—$CH_2$—COOH, —CO—CH═CH—$CH_2$—$CH_2$—$CH_2$—COOH, —CO—CH═CH—$CH_2$—$CH_2$—$CH_2$—$CH_2$—COOH, —CO—$CH_2$—CH═CH—COOH, —CO—$CH_2$—CH═CH—$CH_2$—COOH, —CO—$CH_2$—CH═CH—$CH_2$—$CH_2$—COOH, —CO—$CH_2$—CH═CH—$CH_2$—$CH_2$—$CH_2$—COOH, —CO—$CH_2$—CH═CH—$CH_2$—$CH_2$—$CH_2$—$CH_2$—COOH, —CO—$CH_2$—$CH_2$—CH═CH—COOH, —CO—$CH_2$—$CH_2$—CH═CH—$CH_2$—COOH, —CO—$CH_2$—$CH_2$—CH═CH—$CH_2$—$CH_2$—COOH, —CO—$CH_2$—$CH_2$—$CH_2$—CH═CH—COOH, —CO—$CH_2$—$CH_2$—$CH_2$—CH═CH—$CH_2$—COOH, or —CO—$CH_2$—$CH_2$—$CH_2$—$CH_2$—CH═CH—COOH, but in which at least one, two, three, or more hydrogens thereof is/are substituted with an $R^b$ group (such first groups are examples in which the —$C_x$— portion comprises at least one double-bond in the carbon atom chain and at least one branch comprising an organic group). Suitable examples of $R^b$ groups herein include alkyl groups and alkenyl groups. An alkyl group herein can comprise 1-18 carbons (linear or branched), for example (e.g., methyl, ethyl, propyl, butyl, pentyl, hexyl, heptyl, octyl, nonyl, or decyl group). An alkenyl group herein can comprise 1-18 carbons (linear or branched), for example (e.g., methylene, ethenyl, propenyl, butenyl, pentenyl, hexenyl, heptenyl, octenyl [e.g., 2-octenyl], nonenyl [e.g., 2-nonenyl], or decenyl group).

As further disclosed below regarding processes for synthesizing a poly alpha-1,3-glucan ester compound, each of these first groups comprising a —$C_x$— portion with at least one organic group branch can be derived by reacting the appropriate cyclic organic anhydride with poly alpha-1,3-glucan. An example of using 2-nonen-1-yl succinic anhydride is described above. Another illustrative example includes using methylsuccinic anhydride to ester-derivatize poly alpha-1,3-glucan, where the resultant first group is —CO—$CH_2$—CH($CH_3$)—COOH or —CO—CH($CH_3$)—$CH_2$—COOH. Still another illustrative example includes using methylmaleic anhydride to ester-derivatize poly alpha-1,3-glucan, where the resultant first group is —CO—CH═C($CH_3$)—COOH or —CO—C($CH_3$)═CH—COOH. Still another illustrative example includes using itaconic anhydride (2-methylenesuccinic anhydride) to ester-derivatize poly alpha-1,3-glucan, where the resultant first group is —CO—$CH_2$—C($CH_2$)—COOH or —CO—C($CH_2$)—$CH_2$—COOH. Thus, a cyclic organic anhydride comprising a —$C_x$— portion represented in any of the above-listed first groups (where the corresponding —$C_x$— portion of a cyclic organic anhydride is that portion linking each side of the anhydride group [—CO—O—CO—] together to form a cycle) can be reacted with poly alpha-1,3-glucan to produce an ester thereof having the corresponding first group (—CO—$C_x$—COOH).

Poly alpha-1,3-glucan ester compounds in certain embodiments can contain one type of a first group comprising —CO—$C_x$—COOH. For example, one or more R groups ester-linked to the glucose group in the above formula may be —CO—CH$_2$—CH$_2$—COOH; the R groups in this particular example would thus independently be hydrogen and —CO—CH$_2$—CH$_2$—COOH groups (such an ester compound can be referred to as poly alpha-1,3-glucan succinate). As another example, one or more R groups ester-linked to the glucose group in the above formula may be —CO—CH═CH—COOH; the R groups in this particular example would thus independently be hydrogen and —CO—CH═CH—COOH groups (such an ester compound can be referred to as poly alpha-1,3-glucan maleate).

Alternatively, poly alpha-1,3-glucan ester compounds disclosed herein can contain two or more different types of a first group comprising —CO—C$_x$—COOH (i.e., they can be mixed esters). Examples of such poly alpha-1,3-glucan mixed ester compounds can contain —CO—CH$_2$—CH$_2$—COOH and —CO—CH═CH—COOH as first groups (such an ester compound can be referred to as poly alpha-1,3-glucan succinate maleate). Other examples of such compounds contain both of the following first groups:

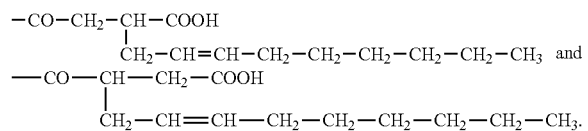

These two first groups can be derived by reacting a single cyclic organic anhydride (2-nonen-1-yl succinic anhydride) with poly alpha-1,3-glucan. Thus, it would be understood that certain cyclic organic anhydrides, when used to ester-derivatize poly alpha-1,3-glucan, can yield two different esterified first groups, since there are two ways, structurally speaking, in which the cyclic anhydride can react with glucan hydroxyl groups.

The —C$_x$— portion of the first group (—CO—C$_x$—COOH) of a poly alpha-1,3-glucan ester compound in some aspects does not comprise any cycle/ring structure such as a benzene ring.

Those skilled in the art would understand that in certain embodiments herein, a poly alpha-1,3-glucan ester compound can be in an anionic form under aqueous conditions. This anionic behavior is due to the presence of a carboxyl group (COOH) in the esterified first group (—CO—C$_x$—COOH). Carboxyl (COOH) groups of a poly alpha-1,3-glucan ester compound herein can convert to carboxylate (COO$^-$) groups in aqueous conditions. These anionic groups can interact with salt cations such as potassium, sodium, or lithium cations, if present.

Poly alpha-1,3-glucan ester compounds herein have a degree of substitution (DoS) with one or more first groups (—CO—C$_x$—COOH) of about 0.001 to about 3.0. Alternatively, the DoS of a poly alpha-1,3-glucan ester compound can be about 0.001 to about 0.02, 0.025, 0.03, 0.035, 0.04, 0.05, 0.06, 0.07, 0.08, 0.09, 0.1, 0.25, 0.5, or 1.0, for example. Alternatively still, it is believed that the DoS can be at least about 0.001, 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, for example. The DoS can optionally be expressed as a range between any two of these values. It would be understood by those skilled in the art that, since a poly alpha-1,3-glucan ester compound herein has a degree of substitution between about 0.001 to about 3.0, the R groups of the compound cannot only be hydrogen.

The wt % of one or more first groups (—CO—C$_x$—COOH) in a poly alpha-1,3-glucan ester compound herein can be referred to, if desired, instead of or in addition to referencing a DoS value. For example, the wt % of a first group in a poly alpha-1,3-glucan ester compound can be at least about 0.1%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, or 60%. The wt % can optionally be expressed as a range between any two of these values.

A poly alpha-1,3-glucan ester compound herein can have at least about 50%, 60%, 70%, 80%, 90%, 95%, 96%, 97%, 98%, 99%, or 100% (or any integer between 50% and 100%) glycosidic linkages that are alpha-1,3. In such embodiments, accordingly, the poly alpha-1,3-glucan ester compound has less than about 50%, 40%, 30%, 20%, 10%, 5%, 4%, 3%, 2%, 1%, or 0% (or any integer value between 0% and 50%) of glycosidic linkages that are not alpha-1,3. A poly alpha-1,3-glucan ester compound preferably has at least about 98%, 99%, or 100% glycosidic linkages that are alpha-1,3.

The backbone of a poly alpha-1,3-glucan ester compound herein is preferably linear/unbranched. In certain embodiments, the compound has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points.

The formula of a poly alpha-1,3-glucan ester compound in certain embodiments can have an n value of at least 6. Alternatively, n can have a value of at least 10, 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 (or any integer between 10 and 4000), for example. The value of n in still other examples can be in a range of 25-250, 50-250, 75-250, 100-250, 150-250, 200-250, 25-200, 50-200, 75-200, 100-200, 150-200, 25-150, 50-150, 75-150, 100-150, 25-100, 50-100, 75-100, 25-75, 50-75, or 25-50.

The molecular weight of a poly alpha-1,3-glucan ester compound disclosed herein can be measured as number-average molecular weight ($M_n$) or as weight-average molecular weight ($M_w$). Alternatively, molecular weight can be measured in Daltons or grams/mole. It may also be useful to refer to the DP$_w$ (weight average degree of polymerization) or DP$_n$ (number average degree of polymerization) of the poly alpha-1,3-glucan polymer component of the compound. The $M_n$ or $M_w$ of a poly alpha-1,3-glucan ester compound herein can be at least about 1000, for example. Alternatively, the $M_n$ or $M_w$ can be at least about 1000 to about 600000. Alternatively still, the $M_n$ or $M_w$ can be at least about 10000, 25000, 50000, 75000, 100000, 125000, 150000, 175000, 200000, 225000, 250000, 275000, or 300000 (or any integer between 10000 and 300000), for example.

Suitable compositions comprising a poly alpha-1,3-glucan ester compound as presently disclosed are contemplated to include fibers (e.g., spun fiber) and films, for example.

A fiber in certain aspects can be a continuous filament, discontinuous filament, or staple fiber. For preparing a spun fiber herein, a poly alpha-1,3-glucan ester compound is typically first dissolved in a solvent such as an organic halide, organic acid, fluorinated alcohol, or mixture thereof. Representative of such solvents are methylene chloride (dichloromethane), trifluoroacetic acid, trichloroacetic acid, dichloroacetic acid, formic acid, hexafluoroisopropanol, and mixtures such as trifluoroacetic acid/methylene chloride, trichloroacetic acid/methylene chloride, dichloroacetic acid/methylene chloride, and formic acid/methylene chloride. Other suitable solvents include molecules which are non-solvents by themselves (e.g., water) in combination with strong organic acids, such as trifluoroacetic acid/water, trichloroacetic acid/water, dichloroacetic acid/water, or formic acid/water. A solution thus prepared can then be used for spinning. A spinning solution can be forced by means such a piston or pump through a single or multi-holed spinneret or other form of die, for example. A spinneret can be of any cross-sectional shape, including round, flat, multi-lobal, and the like, for example. An extruded strand can then be passed by ordinary means into a coagulation bath containing a liquid that dissolves the solvent of the spinning solvent but not the ester compound, thus causing the highly oriented polymer to coagulate into a spun fiber. A fiber herein can comprise other components, such as a pigment or dye.

A poly alpha-1,3-glucan ester compound herein is believed to be useful for preparing a film in some aspects. A poly alpha-1,3-glucan ester compound as presently disclosed typically can be dissolved in one or more solvents to provide a solution of the compound. Solvents that may be useful for this purpose include, but are not limited to, methylene chloride (dichloromethane); methanol; chloroform; tetrachloroethane; formic acid; acetic acid; nitrobenzene; bromoform; pyridine; dioxane; ethanol; acetone; alcohols; aromatic compounds such as monochlorobenzene, benzene and toluene; esters such as ethyl acetate and propyl acetate; ethers such as tetrahydrofuran, methyl cellosolve and ethylene glycol monomethyl ether; or combinations thereof. A solution thus prepared can be applied to a surface after which the solvent is allowed to evaporate to form a film of desired thickness. Surfaces suitable for this application can be, for example, glass, Teflon®, plastic, or various types of substrates. Methods of making films using any of the foregoing solutions include, but not limited to, solution casting, spin coating, thermal and regular spraying.

The tear resistance, tensile strength, temperature stability, haze and transmittance of a film herein can be determined by any known method. As used herein, the term "tear resistance" is defined as a measure of how well a film can withstand the effects of tearing. The term "tensile strength" as used herein refers to the maximum tension a film can withstand without tearing. The suitable tear resistance for a poly alpha-1,3-glucan ester film disclosed herein can be at least about 0.1 gf/mil, for example. The tensile strength of a film herein can be at least about 5 or 10 kg/mm$^2$, for example. As used herein, the term "haze" refers to the percentage of light that is deflected more than 2.5 degrees from the incoming light direction. Low haze values typically correspond to better clarity. The term "transmittance" as used herein refers to the fraction of incident light at a specified wavelength that passes through a film. A poly alpha-1,3-glucan ester film herein can have a haze below about 20%, and/or a transmittance of at least about 80%, for example.

Embodiments of the present disclosure also concern a method of producing a poly alpha-1,3-glucan ester compound. This method comprises:

(a) contacting poly alpha-1,3-glucan in a reaction with a cyclic organic anhydride, thereby producing a poly alpha-1,3-glucan ester compound represented by the structure:

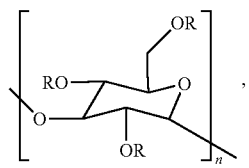

wherein
 (i) n is at least 6;
 (ii) each R is independently an —H or a first group comprising —CO—$C_x$—COOH, wherein the —$C_x$— portion of the first group typically comprises a chain of 2 to 6 carbon atoms; and
 (iii) the compound has a degree of substitution with the first group of about 0.001 to about 3.0; and (b) optionally, isolating the poly alpha-1,3-glucan ester compound produced in step (a). It is believed that any poly alpha-1,3-glucan ester compound as presently disclosed can be produced following this method, which can also be characterized as an esterification reaction or esterification method, for example. Significantly, an esterification reaction herein can optionally comprise a limited number of reagents (e.g., only poly alpha-1,3-glucan and cyclic organic anhydride). Also, glucan ester products of this reaction can be isolated in a facile manner.

Poly alpha-1,3-glucan is contacted with at least one cyclic organic anhydride in the disclosed reaction. A cyclic organic anhydride herein can have the formula:

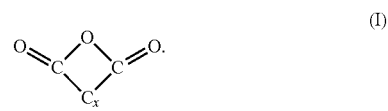

(I)

The —$C_x$— portion of formula I typically comprises a chain of 2 to 6 carbon atoms, each carbon atom preferably having four covalent bonds. It is contemplated that, in some embodiments, the —$C_x$— portion can comprise a chain of 2 to 16, 2 to 17, or 2 to 18 carbon atoms. During a reaction of the present method, the anhydride group (—CO—O—CO—) of the cyclic organic anhydride breaks such that one end of the broken anhydride becomes a COOH group and the other end is esterified to a hydroxyl group of the poly alpha-1,3-glucan, thereby rendering an esterified first group (—CO—$C_x$—COOH). Depending on the cyclic organic anhydride used, there typically can be one or two possible products of such an esterification reaction.

Examples of cyclic organic anhydrides that can be included in a reaction herein include succinic anhydride, glutaric anhydride, adipic anhydride, pimelic anhydride, and suberic anhydride. These can be used, respectively, to esterify —CO—$CH_2$—$CH_2$—COOH, —CO—$CH_2$—$CH_2$—$CH_2$—COOH, —CO—$CH_2$—$CH_2$—$CH_2$—$CH_2$—COOH, —CO—$CH_2$—$CH_2$—$CH_2$—$CH_2$—$CH_2$—COOH, and —CO—$CH_2$—$CH_2$—$CH_2$—$CH_2$—$CH_2$—$CH_2$—COOH as a first group to poly alpha-1,3-glucan. These are all examples of first groups in which the —$C_x$— portion comprises only $CH_2$ groups. Thus, a cyclic organic anhydride herein can be one in which the —$C_x$— portion of formula I comprises only $CH_2$ groups (e.g., 2 to 6 $CH_2$ groups).

A cyclic organic anhydride herein can be, in some aspects, one in which the —$C_x$— portion of formula I comprises at least one double-bond in the carbon atom chain. Examples of such cyclic organic anhydrides include those that would yield any of the following first groups: —CO—CH=CH—COOH, —CO—CH=CH—CH$_2$—COOH, —CO—CH=CH—CH$_2$—CH$_2$—COOH, —CO—CH=CH—CH$_2$—CH$_2$—CH$_2$—COOH, —CO—CH=CH—CH$_2$—CH$_2$—CH$_2$—CH$_2$—COOH, —CO—CH$_2$—CH=CH—COOH, —CO—CH$_2$—CH=CH—CH$_2$—COOH, —CO—CH$_2$—CH=CH—CH$_2$—CH$_2$—COOH, —CO—CH$_2$—CH=CH—CH$_2$—CH$_2$—CH$_2$—COOH, —CO—CH$_2$—CH$_2$—CH=CH—COOH, —CO—CH$_2$—CH$_2$—CH=CH—CH$_2$—COOH, —CO—CH$_2$—CH$_2$—CH=CH—CH$_2$—CH$_2$—COOH, —CO—CH$_2$—CH$_2$—CH$_2$—CH=CH—COOH, —CO—CH$_2$—CH$_2$—CH$_2$—CH=CH—CH$_2$—COOH, or —CO—CH$_2$—CH$_2$—CH$_2$—CH$_2$—CH=CH—COOH. One of skill in the art would understand, based on formula I and its involvement in the disclosed esterification process (described above), what particular cyclic organic anhydride is suitable for deriving any of these first groups.

A cyclic organic anhydride herein can be, in some aspects, one in which the —C$_x$— portion of formula I comprises at least one branch comprising an organic group. Examples of such cyclic organic anhydrides include those that would yield —CO—CH$_2$—CH(CH$_2$CH=CHCH$_2$CH$_2$CH$_2$CH$_2$CH$_3$)—COOH or —CO—CH(CH$_2$CH=CHCH$_2$CH$_2$CH$_2$CH$_2$CH$_3$)—CH$_2$—COOH as first groups. Other examples of such cyclic organic anhydrides include those that would yield —CO—CH$_2$—CH$_2$—COOH, —CO—CH$_2$—CH$_2$—CH$_2$—COOH, —CO—CH$_2$—CH$_2$—CH$_2$—CH$_2$—COOH, —CO—CH$_2$—CH$_2$—CH$_2$—CH$_2$—CH$_2$—COOH, or —CO—CH$_2$—CH$_2$—CH$_2$—CH$_2$—CH$_2$—CH$_2$—COOH as first groups, but in which at least one, two, three, or more hydrogens thereof is/are substituted with an organic group branch (R$^b$). Still other examples of such cyclic organic anhydrides include those that would yield —CO—CH=CH—CH$_2$—COOH, —CO—CH=CH—CH$_2$—CH$_2$—COOH, —CO—CH=CH—CH$_2$—CH$_2$—CH$_2$—COOH, —CO—CH=CH—CH$_2$—CH$_2$—CH$_2$—CH$_2$—COOH, —CO—CH$_2$—CH=CH—COOH, —CO—CH$_2$—CH=CH—CH$_2$—COOH, —CO—CH$_2$—CH=CH—CH$_2$—CH$_2$—COOH, —CO—CH$_2$—CH=CH—CH$_2$—CH$_2$—CH$_2$—COOH, —CO—CH$_2$—CH$_2$—CH=CH—COOH, —CO—CH$_2$—CH$_2$—CH=CH—CH$_2$—COOH, —CO—CH$_2$—CH$_2$—CH=CH—CH$_2$—CH$_2$—COOH, —CO—CH$_2$—CH$_2$—CH$_2$—CH=CH—COOH, —CO—CH$_2$—CH$_2$—CH$_2$—CH=CH—CH$_2$—COOH, or —CO—CH$_2$—CH$_2$—CH$_2$—CH$_2$—CH=CH—COOH as first groups, but in which at least one, two, three, or more hydrogens thereof is/are substituted with an R$^b$ group. Suitable examples of R$^b$ groups herein include alkyl groups and alkenyl groups. An alkyl group herein can comprise 1-18 carbons (linear or branched), for example (e.g., methyl, ethyl, propyl, butyl, pentyl, hexyl, heptyl, octyl, nonyl, or decyl group). An alkenyl group herein can comprise 1-18 carbons (linear or branched), for example (e.g., methylene, ethenyl, propenyl, butenyl, pentenyl, hexenyl, heptenyl, octenyl [e.g., 2-octenyl], nonenyl [e.g., 2-nonenyl], or decenyl group). One of skill in the art would understand, based on formula I and its involvement in the disclosed esterification process (described above), what particular cyclic organic anhydride is suitable for deriving any of these first groups.

Examples of cyclic organic anhydrides by name that can be included in a reaction herein include maleic anhydride, methylsuccinic anhydride, methylmaleic anhydride, dimethylmaleic anhydride, 2-ethyl-3-methylmaleic anhydride, 2-hexyl-3-methylmaleic anhydride, 2-ethyl-3-methyl-2-pentenedioic anhydride, itaconic anhydride (2-methylenesuccinic anhydride), 2-nonen-1-yl succinic anhydride, and 2-octen-1-yl succinic anhydride. In particular, for example, maleic anhydride can be used to esterify —CO—CH=CH—COOH as a first group to poly alpha-1,3-glucan; methylsuccinic anhydride can be used to esterify —CO—CH$_2$—CH(CH$_3$)—COOH and/or —CO—CH(CH$_3$)—CH$_2$—COOH as a first group to poly alpha-1,3-glucan; methylmaleic anhydride can be used to esterify —CO—CH=C(CH$_3$)—COOH and/or —CO—C(CH$_3$)=CH—COOH as a first group to poly alpha-1,3-glucan; dimethylmaleic anhydride can be used to esterify —CO—C(CH$_3$)=C(CH$_3$)—COOH as a first group to poly alpha-1,3-glucan; 2-ethyl-3-methylmaleic anhydride can be used to esterify —CO—C(CH$_2$CH$_3$)=C(CH$_3$)—COOH and/or —CO—C(CH$_3$)=C(CH$_2$CH$_3$)—COOH as a first group to poly alpha-1,3-glucan; 2-hexyl-3-methylmaleic anhydride can be used to esterify —CO—C(CH$_2$CH$_2$CH$_2$CH$_2$CH$_2$CH$_3$)=C(CH$_3$)—COOH and/or —CO—C(CH$_3$)=C(CH$_2$CH$_2$CH$_2$CH$_2$CH$_2$CH$_3$)—COOH as a first group to poly alpha-1,3-glucan; itaconic anhydride can be used to esterify —CO—CH$_2$—C(CH$_2$)—COOH and/or —CO—C(CH$_2$)—CH$_2$—COOH as a first group to poly alpha-1,3-glucan; 2-nonen-1-yl succinic anhydride can be used to esterify —CO—CH$_2$—CH(CH$_2$CH=CHCH$_2$CH$_2$CH$_2$CH$_2$CH$_3$)—COOH and/or —CO—CH(CH$_2$CH=CHCH$_2$CH$_2$CH$_2$CH$_2$CH$_3$)—CH$_2$—COOH as a first group to poly alpha-1,3-glucan.

One, two, three, or more cyclic organic anhydrides as presently disclosed can be used in an esterification reaction, for example. A cyclic organic anhydride can typically be obtained commercially in a concentrated (e.g., >95%, 96%, 97%, 98%, or 99% pure) form. The amount of cyclic organic anhydride in an esterification reaction herein can be at least about 25, 30, 35, 40, 45, 50, 55, 60, 65, 70, 75, 80, 85, or 90 wt % (or any integer value between 25 and 90 wt %), for example.

The —C$_x$— portion of a cyclic organic anhydride in some aspects does not comprise any cycle/ring structure such as a benzene ring.

In certain embodiments, an esterification reaction initially consists of poly alpha-1,3-glucan and cyclic organic anhydride, where the cyclic organic anhydride is melted. Such a reaction thus does not initially comprise any additional components such as a catalyst (e.g., acid catalyst such as sulfuric acid), organic solvent (beyond the solvent that is provided by virtue of using melted cyclic organic anhydride), or aqueous solvent. It is believed that just after, or within a few moments (e.g., 5-10 seconds) of initial reaction setup, glucan ester product and water are formed. No exogenous components (e.g., catalyst, organic or aqueous solvent) are added to an ongoing reaction (post-initial reaction conditions) in some embodiments.

A cyclic organic anhydride herein can typically be melted by raising its temperature over its melting point by at least 1, 2, 3, 4, 5, 6, 7, 8, 9, or 10° C. Melting points for cyclic organic anhydrides herein are believed to be known in the art or readily determinable. Melting of cyclic organic anhydride can be performed first, followed by addition of poly alpha-1,3-glucan, or can be performed in the presence of poly alpha-1,3-glucan. Such reactions can be agitated (e.g., stirred, rotated), if desired. In some aspects of this process, an esterification reaction can be held for about 1, 2, 3, 4, 5, 6, or more hours at, or above, a temperature that keeps the cyclic organic anhydride(s) melted.

In some alternative embodiments, an esterification reaction herein can comprise poly alpha-1,3-glucan, melted cyclic organic anhydride and one or more additional components. Suitable additional components include, for instance, one or more catalysts (e.g., acid catalyst) and/or organic solvents.

An esterification reaction in some aspects can comprise aqueous conditions (e.g., when preparing the initial reaction). For example, an esterification reaction, as initially set up, can comprise about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt % water. As another example, there can initially be about 1-30, 5-30, 10-30, 15-30, 20-30, 25-30, 1-25, 5-25, 10-25, 15-25, 20-25, 1-20, 5-20, 10-20, 15-20, 1-15, 5-15, 10-15, 1-10, 5-10, or 1-5 wt % water in an esterification reaction herein. An esterification reaction herein thus does not need to be anhydrous in some embodiments.

In certain embodiments in which aqueous conditions are comprised in an esterification reaction herein, a basic pH in maintained during the reaction. For example, a basic pH can be maintained throughout most of, or all of, the reaction. A basic pH can be between about 7.5-10.0, for example. In other examples, a basic pH can have a range of about 7.5-9.5, 7.5-9.0, 7.5-8.5, 7.5-8.0, 8.0-9.5, 8.0-9.0, or 8.0-8.5. Maintenance of a particular basic pH during an esterification reaction can be done following various means, such as by adding an alkali hydroxide (e.g., NaOH) accordingly.

By "all of" a reaction, it is meant that a basic pH is maintained starting from the beginning of the reaction, for example, when at least poly alpha-1,3-glucan and a cyclic organic anhydride are put together under aqueous conditions, to the end of the reaction. The end of a reaction can be arbitrarily set (e.g., ester product formed at a given point in time can then be isolated), or can be when the basic pH remains relatively unchanged (within 0.1-0.3 from the pH value being maintained) (e.g., exogenous base such as alkali hydroxide no longer has to be added to maintain the target basic pH). By "most of" a reaction, it is meant that a basic pH is maintained through at least about 90% or 95% of the reaction, such as from the beginning of the reaction to a time at which most of the anticipated ester product has been produced. An esterification reaction in any of these embodiments can be ended, for example, by dropping the pH to about neutral (e.g., pH of about 6.75-7.25, or about 7.0).

Aqueous conditions of an esterification reaction herein, such as those held at a constant basic pH, can be at a temperature of about 30-50° C. or 35-45° C. (e.g., 40° C.), for example. The amount of cyclic organic anhydride can be as disclosed elsewhere herein, such as those amounts of melted anhydride applied in some other aspects. While an esterification reaction under aqueous conditions can be set up in various ways, an example is to provide poly alpha-1,3-glucan in water at a basic pH, after which cyclic organic anhydride is added. An esterification reaction under aqueous conditions can be held for about 1, 2, 3, 4, 5, 6, 7, 8 or more hours.

An esterification reaction in some aspects of the present disclosure does not comprise an organic solvent (other than a melted cyclic organic anhydride in certain embodiments, if one is to consider a melted cyclic organic anhydride as an organic solvent). Examples of organic solvents that can be excluded (e.g., toluene) are disclosed below.

In some alternative embodiments, one or more organic solvents can be included in an esterification reaction. Suitable organic solvents include formamide; methylene chloride (dichloromethane); alcohols such as methanol and ethanol; chloroform; bromoform; tetrachloroethane; organic acids such as formic acid and acetic acid; pyridine; dioxane; acetone; aromatic compounds such as monochlorobenzene, benzene, nitrobenzene, and toluene; esters such as ethyl acetate and propyl acetate; and ethers such as tetrahydrofuran, methyl cellosolve and ethylene glycol monomethyl ether.

An esterification reaction in certain embodiments does not comprise a catalyst. In some alternative embodiments, one or more catalysts can be included. Examples of catalysts herein include acid catalysts, such inorganic acid. Examples of an inorganic acid include sulfuric acid and perchloric acid. Other examples of inorganic acid catalysts include hydrochloric, phosphoric, nitric, boric, hydrofluoric, hydrobromic, sulfonic, any mineral acid, and any combination thereof. Another example of a catalyst is pyridine.

Poly alpha-1,3-glucan substrate can be provided in an esterification reaction herein at a weight percentage of about, or at least about 5%, 10%, 15%, 20%, 25%, 30%, 35%, 40%, 45%, or 50%, for example.

Poly alpha-1,3-glucan used to prepare poly alpha-1,3-glucan ester compounds herein can have at least about 50%, 60%, 70%, 80%, 90%, 95%, 96%, 97%, 98%, 99%, or 100% (or any integer between 50% and 100%) glycosidic linkages that are alpha-1,3, for example. In such embodiments, accordingly, the poly alpha-1,3-glucan substrate has less than about 50%, 40%, 30%, 20%, 10%, 5%, 4%, 3%, 2%, 1%, or 0% (or any integer value between 0% and 50%) of glycosidic linkages that are not alpha-1,3. A poly alpha-1,3-glucan substrate preferably has at least about 98%, 99%, or 100% glycosidic linkages that are alpha-1,3.

The backbone of poly alpha-1,3-glucan used to prepare poly alpha-1,3-glucan ester compounds herein is preferably linear/unbranched. In certain embodiments, poly alpha-1,3-glucan substrate has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points.

Poly alpha-1,3-glucan used to prepare poly alpha-1,3-glucan ester compounds in certain embodiments can have a $DP_w$ or $DP_n$ of at least 6. Alternatively, $DP_w$ or $DP_n$ can be at least 10, 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 (or any integer between 10 and 4000), for example. $DP_w$ or $DP_n$ in still other examples can be in a range of 25-250, 50-250, 75-250, 100-250, 150-250, 200-250, 25-200, 50-200, 75-200, 100-200, 150-200, 25-150, 50-150, 75-150, 100-150, 25-100, 50-100, 75-100, 25-75, 50-75, or 25-50.

The $M_n$ or $M_w$ of a poly alpha-1,3-glucan substrate useful herein can be at least about 1000, for example. Alternatively, the $M_n$ or $M_w$ can be at least about 1000 to about 600000. Alternatively still, the $M_n$ or $M_w$ can be at least about 5000, 10000, 25000, 50000, 75000, 100000, 125000, 150000, 175000, 200000, 225000, 250000, 275000, or 300000 (or any integer between 10000 and 300000), for example.

Poly alpha-1,3-glucan used for preparing poly alpha-1,3-glucan ester compounds herein can optionally be enzymatically produced from sucrose using one or more glucosyltransferase (gtf) enzymes. Poly alpha-1,3-glucan produced by such an enzymatic reaction can be purified before using it to prepare an ester. Alternatively, a poly alpha-1,3-glucan product of a gtf reaction can be used with little or no processing for preparing poly alpha-1,3-glucan ester compounds. Examples of suitable gtf enzymes and reaction conditions for synthesizing poly alpha-1,3-glucan substrate are disclosed in U.S. Appl. Publ. No. 2014/0087431, for example. Poly alpha-1,3-glucan does not have to be acid-exchanged before providing it as a substrate in an esterification reaction.

A poly alpha-1,3-glucan slurry can be used directly in any of the above processes for producing a poly alpha-1,3-glucan ester compound disclosed herein. As used herein, a "poly alpha-1,3-glucan slurry" refers to a mixture comprising the components of a gtf enzymatic reaction. A gtf enzymatic reaction can include, in addition to poly alpha-1,3-glucan itself, various components such as sucrose, one or more gtf enzymes, glucose, fructose, leucrose, buffer, FermaSure®, soluble oligosaccharides, oligosaccharide primers, bacterial enzyme extract components, borates, sodium hydroxide, hydrochloric acid, cell lysate, proteins and/or nucleic acids. Minimally, the components of a gtf enzymatic reaction can include, in addition to poly alpha-1,3-glucan itself, sucrose, one or more gtf enzymes, glucose, and fructose, for example. In another example, the components of a gtf enzymatic reaction can include, in addition to poly alpha-1,3-glucan itself, sucrose, one or more gtf enzymes, glucose, fructose, leucrose and soluble oligosaccharides (and optionally bacterial enzyme extract components). It should be apparent that poly alpha-1,3-glucan, when in a slurry as disclosed herein, has not been purified or washed. It should also be apparent that a slurry typically represents a gtf enzymatic reaction that is complete or for which an observable amount of poly alpha-1,3-glucan has been produced, which forms a solid since it is insoluble in the aqueous reaction milieu (has pH of 5-7, for example). A poly alpha-1,3-glucan slurry can be prepared by setting up a gtf reaction as disclosed in U.S. Appl. Publ. No. 2014/0087431, for example, which is incorporated herein by reference.

Alternatively, a wet cake of poly alpha-1,3-glucan can be used directly in any of the above processes for producing a poly alpha-1,3-glucan ester compound herein. A "wet cake of poly alpha-1,3-glucan" as used herein refers to poly alpha-1,3-glucan that has been separated (e.g., filtered) from a slurry and washed with water or an aqueous solution. A wet cake can be washed at least 1, 2, 3, 4, 5, or more times, for example. The poly alpha-1,3-glucan is not dried when preparing a wet cake. A wet cake is termed as "wet" given the retention of water by the washed poly alpha-1,3-glucan.

A wet cake of poly alpha-1,3-glucan can be prepared using any device known in the art for separating solids from liquids, such as a filter or centrifuge. For example, poly alpha-1,3-glucan solids in a slurry can be collected on a Buchner funnel using a mesh screen over filter paper. Filtered wet cake can be resuspended in water (e.g., deionized water) and filtered one or more times to remove soluble components of the slurry such as sucrose, fructose and leucrose. As another example for preparing a wet cake, poly alpha-1,3-glucan solids from a slurry can be collected as a pellet via centrifugation, resuspended in water (e.g., deionized water), and re-pelleted and resuspended one or more additional times. A poly alpha-1,3-glucan wet cake can be entered into a reaction for producing any ester compound herein.

The poly alpha-1,3-glucan substrate and poly alpha-1,3-glucan ester product components of an esterification reaction can each remain in a solid form (i.e., be in an undissolved state) during the reaction in certain embodiments. Thus, an esterification reaction can sometimes be visually characterized as a mixture or slurry. Such embodiments thus take advantage of not having to dissolve poly alpha-1,3-glucan substrate (which typically entails using strongly acidic or basic solvents) and precipitating poly alpha-1,3-glucan ester product.

Optionally, an esterification reaction herein can be maintained under an inert gas (e.g., nitrogen). As used herein, the term "inert gas" refers to a gas which does not undergo chemical reactions under a set of given conditions, such as those disclosed for preparing a reaction herein.

An esterification reaction is typically quenched at or near completion of the reaction. Quenching herein serves to degrade, and thus deactivate, any unreacted cyclic organic anhydride. Quenching can be accomplished by contacting the reaction with water or base, for example. In certain embodiments, an excess amount of water is used that is at least about 1.5, 2, 3, 4, or 5 times the volume of the reaction. The temperature of water for quenching can be elevated, such as at or above 60, 70, 80, 90, 95 or 100° C. Other suitable quenching materials include alkali hydroxide (e.g., 10-20%) (e.g., NaOH) and sodium bicarbonate (e.g., 5-10%) at about room temperature.

Poly alpha-1,3-glucan ester compound can optionally be washed. For example, any of the steps listed in the below Examples can be performed.

A poly alpha-1,3-glucan ester produced in a reaction herein can optionally be isolated. Isolation can be performed with glucan ester product using a funnel, centrifuge, press filter, or any other method or equipment known in the art that allows removal of liquids from solids. An isolated poly alpha-1,3-glucan ester product can be dried using any method known in the art, such as vacuum drying, air drying (e.g., ~16-35° C.), or freeze drying. In some embodiments, isolating a glucan ester product can simply be done by (or consist of) adding an excess amount of water, followed by separating and/or drying the ester product.

Any of the above esterification reactions can be repeated using a poly alpha-1,3-glucan ester product as the starting material for further modification. This approach may be suitable for increasing the DoS of an ester group, and/or adding one or more different ester groups to the product.

The structure, molecular weight and DoS of a poly alpha-1,3-glucan ester product herein can be confirmed using various physiochemical analyses known in the art such as NMR spectroscopy and size exclusion chromatography (SEC).

Non-limiting examples of compositions and methods disclosed herein include:

1. A composition comprising a poly alpha-1,3-glucan ester compound represented by the structure:

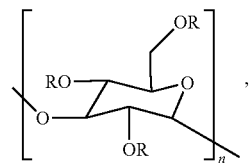

wherein
(i) n is at least 6;
(ii) each R is independently an —H or a first group comprising —CO—$C_x$—COOH, wherein the —$C_x$— portion of the first group comprises a chain of 2 to 6 carbon atoms (each carbon atom preferably has four covalent bonds); and
(iii) the compound has a degree of substitution with the first group of about 0.001 to about 3.0.

2. The composition of embodiment 1, wherein the —$C_x$— portion of the first group comprises only $CH_2$ groups.
3. The composition of embodiment 2, wherein the first group comprises:
   —CO—$CH_2$—$CH_2$—COOH,
   —CO—$CH_2$—$CH_2$—$CH_2$—COOH,
   —CO—$CH_2$—$CH_2$—$CH_2$—$CH_2$—COOH,
   —CO—$CH_2$—$CH_2$—$CH_2$—$CH_2$—$CH_2$—COOH, or
   —CO—$CH_2$—$CH_2$—$CH_2$—$CH_2$—$CH_2$—$CH_2$—COOH.
4. The composition of embodiment 1, wherein the —$C_x$— portion of the first group comprises:
   (i) at least one double-bond in the carbon atom chain, and/or
   (ii) at least one branch comprising an organic group.
5. The composition of embodiment 4, wherein the —$C_x$— portion of the first group comprises at least one double-bond in the carbon atom chain.
6. The composition of embodiment 5, wherein the first group comprises: —CO—CH=CH—COOH.
7. The composition of embodiment 4, wherein the —$C_x$— portion of the first group comprises at least one branch comprising an organic group.
8. The composition of embodiment 7, wherein the first group comprises:

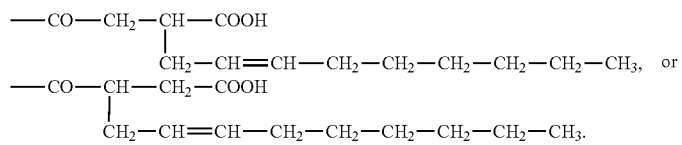

9. A method of producing a poly alpha-1,3-glucan ester compound, the method comprising:
   (a) contacting poly alpha-1,3-glucan in a reaction with a cyclic organic anhydride, thereby producing a poly alpha-1,3-glucan ester compound represented by the structure:

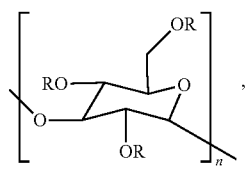

wherein
   (i) n is at least 6;
   (ii) each R is independently an —H or a first group comprising —CO—$C_x$—COOH, wherein the —$C_x$— portion of the first group comprises a chain of 2 to 6 carbon atoms (each carbon atom preferably has four covalent bonds); and
   (iii) the compound has a degree of substitution with the first group of about 0.001 to about 3.0; and
   (b) optionally, isolating the poly alpha-1,3-glucan ester compound produced in step (a).
10. The method of embodiment 9, wherein the reaction initially consists of the poly alpha-1,3-glucan and cyclic organic anhydride, wherein the cyclic organic anhydride is melted.
11. The method of embodiment 9, wherein the reaction does not comprise an organic solvent.
12. The method of embodiment 9 or 11, wherein the reaction comprises aqueous conditions.
13. The method of embodiment 12, wherein a basic pH is maintained during the reaction.
14. The method of embodiment 9, 10, 11, 12, or 13, wherein the poly alpha-1,3-glucan and poly alpha-1,3-glucan ester are each in a solid form during the reaction.
15. The method of embodiment 9, 11, 12, 13, or 14, wherein the reaction does not comprise a catalyst.

EXAMPLES

The present disclosure is further exemplified in the following Examples. It should be understood that these Examples, while indicating certain preferred aspects herein, are given by way of illustration only. From the above discussion and these Examples, one skilled in the art can ascertain any essential characteristics of the disclosed embodiments, and without departing from the spirit and scope thereof, can make various changes and modifications to adapt the disclosed embodiments to various uses and conditions.

Example 1

Preparation of Poly Alpha-1,3-Glucan Succinate

This Example describes producing the glucan ester derivative, poly alpha-1,3-glucan succinate.

1 g of dry poly alpha-1,3-glucan (weight average degree of polymerization [$DP_w$]=800) was mixed with 6.4 g of succinic anhydride. This preparation was stirred in a 50-mL round bottom flask on a magnetic stir plate at 120° C. for 3 hours. This step allowed for melting of the succinic anhydride, allowing its reaction with the poly alpha-1,3-glucan. The reaction was then dispersed in deionized (DI) water (80° C.) to degrade any remaining (unreacted) succinic anhydride, thereby quenching the reaction. The solids were washed in a beaker with 80° C. DI water until a neutral pH was achieved, after which they were dried in a vacuum oven with a slight nitrogen bleed until constant dryness was achieved. The succinate functionality of the derivatized poly alpha-1,3-glucan was confirmed via infrared (IR) spectroscopy.

Thus, the glucan ester derivative, poly alpha-1,3-glucan succinate, was prepared and isolated. It is apparent from this Example that an organic solvent is not necessary for carrying out esterification of poly alpha-1,3-glucan with a cyclic organic acid anhydride.

Example 2

Preparation of Poly Alpha-1,3-Glucan Succinate Using Sulfuric Acid Catalyst

This Example describes producing the glucan ester derivative, poly alpha-1,3-glucan succinate, in a process employing a catalyst.

25.4 g of succinic anhydride was added to a 50-mL round bottom flask equipped with an overhead stirrer. The succinic anhydride was heated to 130° C. using an oil bath controlled by a hot plate equipped with a thermocouple. The solid was stirred until it was completely melted (~45 minutes). Three drops of sulfuric acid was added to the melted anhydride, which was then stirred at 130° C. for another 1 minute. 3 g of dry poly alpha-1,3-glucan ($DP_w$=800) was then added, after which the reaction was stirred at 130° C. for 1 hour. The reaction was then dispersed in DI water (80° C.) to degrade any remaining (unreacted) succinic anhydride, thereby quenching the reaction. The solids were washed in a beaker with 80° C. DI water, then with methanol (100%), and finally with 5% sodium bicarbonate until a neutral pH was achieved. The solids were then dried in a vacuum oven with a slight nitrogen bleed until constant dryness was achieved. The succinate functionality of the derivatized poly alpha-1,3-glucan was confirmed via IR spectroscopy.

Thus, the glucan ester derivative, poly alpha-1,3-glucan succinate, was prepared and isolated. It is apparent from Example 1 and this Example that reactions using at least one cyclic organic acid anhydride to ester-derivatize poly alpha-1,3-glucan can be performed with or without the presence of a catalyst.

Example 3

Preparation of Poly Alpha-1,3-Glucan Nonenyl Succinate

This Example describes producing the glucan ester derivative, poly alpha-1,3-glucan nonenyl succinate.

8.1 g of poly alpha-1,3-glucan wet cake (37% solids) ($M_n$=71127) was mixed with 4.9 g of DI water to make a 30% glucan suspension. 4.5% sodium hydroxide was then added to the suspension until the pH was about 8.5. 2-nonen-1-yl succinic anhydride (8.2 g) was added to the preparation, and then the pH was adjusted to 8.0 with 4.5% sodium hydroxide. The preparation was stirred in a 500-mL glass beaker on a magnetic stir plate at 40° C. for 6 hours while maintaining the pH at 8.5 throughout the reaction. When the pH remained constant for at least 30 minutes, the reaction was neutralized to pH 7 using 10% hydrochloric acid. The solids were filtered using a Buchner funnel with 35-micrometer filter paper, and then washed in a beaker by stirring with aqueous methanol (70%) for 20 minutes. After removing the methanol by filtration, the solids were washed two more times with 70% methanol. The solids were then dried in a vacuum oven with a nitrogen bleed. The nonenyl succinate functionality of the derivatized poly alpha-1,3-glucan was confirmed via IR spectroscopy.

Thus, the glucan ester derivative, poly alpha-1,3-glucan nonenyl succinate, was prepared and isolated. This Example demonstrates, for example, that derivatization of poly alpha-1,3-glucan with at least one cyclic organic acid anhydride can be performed under aqueous conditions.

Example 4

Preparation of Poly Alpha-1,3-Glucan Maleate

This Example describes producing the glucan ester derivative, poly alpha-1,3-glucan maleate.

5 g of dry poly alpha-1,3-glucan (weight-average molecular weight [$M_w$]=~200000) was mixed with 30 g of maleic anhydride. This preparation was stirred in a 50-mL round bottom flask on a magnetic stir plate at 87° C. for 5 hours. This step allowed for melting of the maleic anhydride, allowing its reaction with the poly alpha-1,3-glucan. The reaction was then dispersed in DI water (97° C.) to degrade any remaining (unreacted) maleic anhydride, thereby quenching the reaction. The solids were washed in a beaker with 80° C. DI water, then with 5% sodium bicarbonate, and then with methanol (100%) until a neutral pH was achieved. The solids were then dried in a vacuum oven with a slight nitrogen bleed until constant dryness was achieved. The maleate functionality of the derivatized poly alpha-1,3-glucan was confirmed via IR and NMR spectroscopic analyses. The degree of substitution (DoS) of the poly alpha-1,3-glucan maleate was measured to be 0.139 by NMR.

Additional samples of poly alpha-1,3-glucan maleate were prepared using the above process, but with some modifications as delineated in the Table 1.

TABLE 1

Poly Alpha-1,3-Glucan Maleate Samples Prepared under Various Conditions

| Product Sample Designation | Glucan Substrate (g) | Maleic Anhydride (g) | Quench Solution[b] | DoS |
|---|---|---|---|---|
| 124-1 | 5 | 6.1 | DI water (100° C.) | 0.027 |
| 124-2 | 5 | 6.1 | 20% sodium hydroxide | 0[a] |
| 125 | 5 | 9.2 | DI water (100° C.) | 0.049 |
| 130-1 | 5.1 | 7.8 | 5% sodium bicarbonate | 0.048 |
| 130-2 | 5.1 | 7.8 | 15% sodium hydroxide | 0.024 |
| 140 | 100 | 180 | 5% sodium bicarbonate | 0.072 |

[a]Quenching the reaction with 20% sodium hydroxide resulted in hydrolysis of ester groups and thus no functionalization of the poly alpha-1,3-glucan substrate.
[b]This was used to quench the reaction, thereby consuming any remaining (unreacted) anhydride. The listed sodium hydroxide and sodium bicarbonate solutions were at room temperature. After quenching, the solids were washed with 80° C. DI water, and then with methanol (100%).

Thus, the glucan ester derivative, poly alpha-1,3-glucan maleate, was prepared and isolated. This Example is further to Examples 1-3 in showing that esterification of poly alpha-1,3-glucan using a cyclic organic acid anhydride can be performed without an organic solvent.

What is claimed is:

1. A composition comprising a poly alpha-1,3-glucan ester compound represented by the structure:

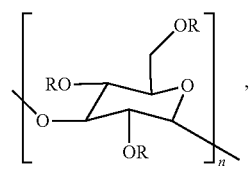

wherein
(i) n is at least 6;
(ii) each R is independently an —H or a first group that is —CO—$C_x$—COOH, wherein the —$C_x$— portion of said first group comprises a chain of 2 to 18 carbon atoms, wherein the carbon atoms of the —$C_x$— portion are only bonded to hydrogens and one branch, wherein the branch is an alkyl or alkenyl group that is 1 to 18 carbons in length; and
(iii) the compound has a degree of substitution with the first group of about 0.001 to about 3.0.

2. The composition of claim 1, wherein the —$C_x$— portion of said first group comprises at least one double-bond in said chain.

3. The composition of claim 1, wherein the branch is said alkenyl group.

4. The composition of claim 1, wherein said first group is:

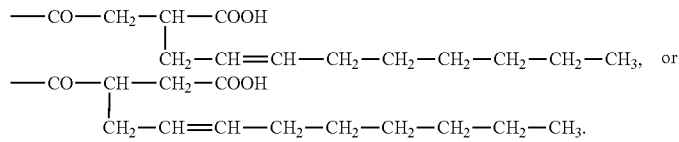

5. The composition of claim 1, wherein the —$C_x$— portion of said first group comprises a chain of 2 to 6 carbon atoms.

6. A method of producing a poly alpha-1,3-glucan ester compound, the method comprising:
contacting poly alpha-1,3-glucan in a reaction with a cyclic organic anhydride, thereby producing a poly alpha-1,3-glucan ester compound according to claim 1.

7. The method of claim 6, wherein the poly alpha-1,3-glucan and poly alpha-1,3-glucan ester are each in a solid form during the reaction.

8. The method of claim 7, wherein the poly alpha-1,3-glucan and poly alpha-1,3-glucan ester are in a slurry during the reaction.

9. The method of claim 6, wherein the reaction does not comprise a catalyst.

10. The method of claim 6, further comprising isolating the poly alpha-1,3-glucan ester compound produced in the contacting step.

11. The method of claim 6, wherein the —$C_x$— portion of said first group comprises a chain of 2 to 6 carbon atoms.

* * * * *